Patented Jan. 2, 1945

2,366,667

UNITED STATES PATENT OFFICE 2,366,667

ESTERS OF 2-BUTENE-1,4-DIOL

George F. Deebel, Dayton, Ohio, assignor to Monsanto Chemical Company, a corporation of Delaware No Drawing. Application December 12, 1942, Serial No. 468,820

4 Claims. (Cl. 260—483)

The present invention relates to esters of dihydroxybutene and more particularly to a process for producing certain new diesters of 2-butene-1,4-diol by the reaction of 1,4-dichlorobutene-2 with salts of aliphatic mono-carboxylic acids.

According to the invention, 1,4-dichlorobutene-2 is reacted with aliphatic mono-carboxylic acids or their salts to give diesters of 1,4-dihydroxybutene-2 having the following general formula:

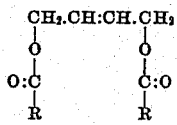

wherein R is a substituted or unsubstituted aliphatic hydrocarbon radical of from 1 to 18 carbon atoms. As illustrative of especially valuable compounds having the above general formula may be mentioned the dibutyrate, the dioctanoate or the dilaurate of 2-butene-1,4-diol. Of particular value are those compounds where R represents four or more carbon atoms.

While it is known to react 1,4-dibromobutene-2 with sodium acetate or silver acetate for the preparation of the diacetate of 1,4-dibromobutene-2, the employment of the more readily available 1,4-dichlorobutene-2 for the preparation of esters of 2-butene-1,4-diol has not been hitherto reported. Moreover, the prior art makes no mention of any other aliphatic monocarboxylic diesters of 2-butene-1,4-diol.

I have prepared a series of such diesters, determined certain physical properties thereof whereby they may be readily identified, and found that certain members of the series are useful in the preparation of highly valuable surface active materials such as wetting agents, detergents, mercerizing assistants, emulsifying agents, pigment dispersing agents, flotation agents, insecticide spreaders, etc. The diesters of long chain acids, i. e., of acids containing more than 3 carbon atoms, are particularly useful for this purpose, yielding upon sulfonation compounds possessing marked surface active properties. The diesters of such long chain acids are likewise readily convertible into compounds having marked hydrophobic properties which compounds may be advantageously employed to confer water-repellent properties upon textile products.

I obtain very good yields of diesters of 2-butene-1,4-diol by operating substantially as follows:

An alkali metal salt of the appropriate aliphatic organic acid is prepared by heating the acid with an alkali carbonate in equimolar proportions until carbon dioxide is no longer given off. To the resulting product there is then added a molecular equivalent of 1,4-dichlorobutene-2 and the mixture is heated to reflux, preferably with stirring, for from 4 to 5 hours. Under these conditions, the reaction is fairly complete with formation of the diester. However, if lower temperatures or a shorter reaction time or smaller quantities of alkali carbonate be employed, then substantially large quantities of mono-ester,

are formed. The alkali chloride formed in the reaction is filtered off, washed free of ester by use of a solvent such as alcohol. The combined filtrates are distilled at reduced pressures. Sometimes it is convenient to avoid removal of the salt by filtration as in the case where the ester is a solid. In many of these latter examples it is advantageous to add small quantities of acetic acid to avoid frothing caused by alkali compounds during distillation.

Operating under the above conditions favorable for diester formation yields of 70–80% are obtained.

The invention is further illustrated, but not limited, by the following examples:

Example 1

*Preparation of 2-butene-1,4-diol diacetate.*—A mixture consisting of 25 g. (0.2 mol) of 1,4-dichlorobutene-2, 49.2 g. (0.6 mol) of sodium acetate and 61.2 g. (0.6 mol) of acetic anhydride (as a suspending agent) was refluxed for a period of 6 hours. At the end of this time the reaction mixture was diluted with water and the product extracted with benzene. Separation of the water and benzene by distillation and fractionation of the residue under reduced pressure, yielded 10.5 g. (63% yield) of substantially pure 2-butene-1,4-diol diacetate, B. P. 125–126° C./20 mm. As a by-product, there was also obtained 5.5 g. (24.3% theoretical yield) of the mono-esterified product, 1-chloro-4-acetoxybutene-2.

Example 2

*Preparation of 2-butene-1,4-diol dipropionate.*—A mixture consisting of 100 g. (1.9 mol) of sodium bicarbonate and 200 g. (2.7 mol) of propionic acid was heated until evolution of carbon dioxide had ceased. To the resulting product there was then added 62.5 g. (0.5 mol) of 1,4-dichlorobutene-2, and the whole was heated under reflux for a time of 4 hours. The reaction mixture was filtered to free it from the sodium chloride which had formed during the condensation, and the sodium chloride was washed with acetone in order to recover any occluded ester. The combined filtrates were then distilled until the excess of sodium propionate which had been originally present in the reaction mixture began to precipitate out. At this point distillation was interrupted, and the residue was treated with water, whereupon a separation of the ester as an upper layer was effected. Extraction of the residue with benzene and a drying of the combined extracts over calcium chloride gave a brown solution. Distillation of this solution under reduced pressure gave 75 g. of the crude diester (75% theoretical yield), B. P. 148–154° C./30–31 mm. Redistillation of this fraction yielded the pure 2-butene-1,4-diol dipropionate, B. P. 151° C./30 mm., $n_D^{20}$ 1.444, $d_{20}^{20}$ 1.042, $M_R$ calcd. 51.23, found 51.01, and analyzing as follows:

|  | Per cent C | Per cent H |
| --- | --- | --- |
| Calcd. for $C_{10}H_{16}O_4$ | 60.00 | 8.00 |
| Found | 60.10 | 8.33 |

Example 3

*Preparation of 2-butene-1,4-diol dibutyrate.*—A mixture consisting of 100 g. (1.9 mol) of sodium bicarbonate and 200 g. (2.27 mol) of butyric acid was heated until no more carbon dioxide was evolved. To the resulting product there was then added 62.5 g. (0.5 mol) of 1,4-dichlorobutene-2 and the whole heated to reflux for a period of 4 hours. During this time the sodium butyrate dissolved and sodium chloride was precipitated. The latter was then filtered off and the precipitate washed with acetone. The washings and the reaction mixture from which the sodium chloride had been removed were subsequently combined and submitted to fractional distillation in order to remove the acetone and some of the excess butyric acid. Distillation was continued until sodium butyrate began to precipitate out. The resulting semi-solid mass was then treated with water, and the ester extracted with benzene. After drying the benzene extract over calcium chloride it was distilled under reduced pressure, 114 g. (78.9% theoretical yield) of substantially pure 2-butene-1,4-diol dibutyrate, B. P. 157–162° C./18 mm., being obtained in this manner. Redistillation of this fraction gave the pure diester, B. P. 155° C./15 mm., $n_D^{20}$ 1.444, $d_{20}^{20}$ 1.004, $M_R$ calcd., 60.47, $M_R$ found 60.32, and analyzing as follows:

|  | Per cent C | Per cent H |
| --- | --- | --- |
| Calcd. for $C_{12}H_{20}O_4$ | 63.10 | 8.77 |
| Found | 63.03 | 8.84 |

Example 4

*Preparation of 2-butene-1,4-diol bis(2-ethylhexanoate).*—A mixture consisting of 400 g. of 2-ethylhexanoic acid and 168 g. of sodium bicarbonate was heated until foaming had stopped. This operation was carried out in a 3-liter flask under reflux during a period of about 30 minutes. There was then added to the reaction mixture 125 g. of 1,4-dichlorobutene-2 and the whole refluxed for a period of 6 hours. At the end of this time the reaction mixture was allowed to attain room temperature and remain at this temperature for about 16 hours. It was then treated with one liter of water. This dissolved the salt and a considerable amount of unreacted acid. The ester layer was washed with water once more, benzene was added to it, and the mixture then submitted to distillation for removal of water and benzene. Addition of 20 cc. of acetic acid minimized formation of foam during this operation and was effective in giving a smooth distillation. In this manner there was obtained 237 g. of a fraction (69.7% theoretical), B. P. 200–210° C./10 mm. This fraction was again distilled, yielding 220 g. of substantially pure 2-butene-1,4-diol bis(2-ethylhexanoate), B. P. 194–200° C./10 mm. which upon redistillation gave the purer product, B. P. 200° C./10 mm. or 171° C./2 mm., $n_D^{20}$ 1.4622, $d_{20}^{20}$ 0.957, $M_R$ calcd. 97.43, found 97.48, and analyzing as follows:

|  | Per cent C | Per cent H |
| --- | --- | --- |
| Calcd. for $C_{20}H_{36}O_4$ | 70.60 | 10.59 |
| Found | 71.15 | 10.18 |

Example 5

*Preparation of 2-butene-1,4-diol dilaurate.*—A mixture consisting of 43 g. of lauric acid, 18 g. of sodium bicarbonate and 100 cc. of water was heated until excess frothing had diminished. To the resulting product there was added 12.5 g. of 1,4-dichlorobutene-2 and the mixture heated for 6 hours under reflux. At the end of this time the product was allowed to attain room temperature, the aqueous layer was separated and the cooled solidified mass submitted to distillation under reduced pressure. In this manner there was obtained 28 g. (62% yield) of the crude diester, B. P. 260–285° C./5 mm. Redistillation of this fraction gave substantially pure 2-butene-1,4-diol dilaurate, B. P. 268–270° C./5 mm., M. P. 40° C., and analyzing as follows:

|  | Per cent C | Per cent H |
| --- | --- | --- |
| Calcd. for $C_{28}H_{52}O_4$ | 74.30 | 11.50 |
| Found | 74.24 | 11.46 |

2-butene-1,4-diol dilaurate is a white, waxy solid, M. P. 40° C., insoluble in water and slightly soluble in alcohol.

Example 6

*Preparation of 2-butene-1,4-diol dilactate.*—A mixture consisting of 240 g. (2.7 mols) of lactic acid and 100 g. (1.2 mols) of sodium bicarbonate was heated to solution and cessation of carbon dioxide liberation. There was then added to the resulting product 62.5 g. (0.5 mol) of 1,4-dichlorobutene-2 and the mixture heated to reflux during a period of 7 hours. The product was then cooled, filtered free of salt and the latter washed with alcohol. The filtrate and the washings were combined and submitted to distillation under reduced pressure, yielding a fraction B. P. 115–175° C./3 mm. Upon cooling, solid lactide, a by-product of the reaction, precipitated out. This was filtered out and the filtrate was submitted to a second distillation which yielded 58 g. (50% theoretical yield) of substantially pure 2-butene-1,4-diol dilactate, B. P. 157–162° C./3 mm., $n_D^{20}$ 1.4675, $d_{20}^{20}$ 1.187, $M_R$ calcd. 54.31, found 54.26, analyzing as follows:

|  | Per cent C | Per cent H |
|---|---|---|
| Calcd. for $C_{10}H_{16}O_6$ | 51.72 | 6.90 |
| Found | 51.93 | 7.31 |

2-butene-1,4-diol dilactate is a light yellow liquid, very soluble in alcohol and water.

Example 7

*Preparation of 2-butene-1,4-diol dilevulinate.*—Levulinic acid was redistilled and the fraction B. P. 155° C./22 mm. employed in this reaction. It was reacted with sodium bicarbonate in the presence of a small amount of water to yield the sodium salt from which water was subsequently removed by heating it to 150° C. A mixture consisting of 138 g. (1 mol) of the sodium levulinate obtained in this manner, 50 g. of 1,4-dichlorobutene-2, 50 cc. of levulinic acid and 200 cc. of toluene was heated, with stirring, under reflux for a period of 22 hours. During the reaction, water was removed by use of a water analysis head inserted between the condenser and the reaction vessel. The reaction mixture was then allowed to remain at room temperature for a period of approximately 16 hours. At the end of this time, toluene and unreacted levulinic acid were removed from the product by distillation under reduced pressure and the residue washed with water to dissolve out any unreacted sodium levulinate. Upon decantation of the aqueous layer and distillation of the residual liquid there was obtained substantially pure 2-butene-1,4-diol dilevulinate, B. P. 210–216° C./8 mm., $n_D^{20}$ 1.474, $d_{20}^{20}$ 1.134, $M_R$ calcd. 69.73, found 70.39, and analyzing as follows:

|  | Per cent C | Per cent H |
|---|---|---|
| Calcd. for $C_{14}H_{20}O_6$ | 59.15 | 7.04 |
| Found | 59.20 | 7.24 |

2-butene-1,4-diol dilevulinate is unstable to heat, distilling with the emission of a gas. It is insoluble in water, but soluble in alcohol and acetone.

The above examples describe the preparation of new aliphatic diesters of 2-butene-1,4-diol. Each of these new esters is of potential interest in the manufacture of such industrially valuable products as surface active agents, water-proofing agents, insecticides, etc., in that to the olefinic double bond thereof there may be readily added, e. g., sulfonic acid groups, radicals containing the amino or cyano group, or other radicals which contribute to surface activity, water-repellency or insecticidal properties of a compound. As has been already noted, the diesters in which the alcoholic alkyl radical contains from 4 to 12 carbon atoms are particularly valuable as intermediates in the preparation of synthetic detergents and wetting agents. Also, the diesters, themselves, find application in the industry as solvents, plasticizers, etc. As examples of these may be mentioned the propionate, which has good solvent properties for cellulose esters and the dilactate and dilevulinate which have a plasticizing effect on a wide variety of synthetic resinous and plastic products.

Instead of the sodium salts which are disclosed in the above examples, we may use other salts of aliphatic monocarboxylic acids for the preparation of the corresponding 2-butene-1,4-diol diesters. Likewise, instead of employing sodium bicarbonate in the preparation of the salts of the acids to be employed in the reaction, we may use other inorganic salts or hydroxides, as will be apparent to those skilled in the art. As has been shown in some of the above examples, the carboxylic acid salt need not be prepared prior to introduction of the diol; that is, the diesters are obtainable also by reaction of the aliphatic carboxylic acid, itself, with the 2-butene-1,4-diol in the presence of a basic reagent.

The carboxylic acids, themselves, may be replaced by mixtures of the carboxylic acid and the corresponding anhydride thereof. The reaction may be effected in presence of a solvent or a diluent, the employment of such a material being especially advantageous when the acidic constituent is a solid like stearic acid. Likewise, reaction may be effected at either ordinary, increased or reduced pressure, the use of reduced pressure being particularly advantageous in the preparation of the higher diesters, for example, in the reaction of 1,4-dichloro-2-butene with stearic acid or technical mixtures thereof.

What I claim is:
1. 2-butene-1,4-diol dilactate.
2. 2-butene-1,4-diol dilaurate.
3. 2-butene-1,4-diol dilevulinate.
4. Compounds of the formula:

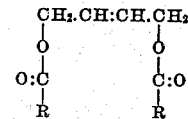

wherein the group R—CO— is derived from an acid selected from the class consisting of 2-ethylhexanoic, lactic, lauric and levulinic acids.

GEORGE F. DEEBEL.